April 27, 1954

E. K. HANSEN 2,676,721

VEHICLE GRAIN UNLOADER

Filed May 4, 1951

INVENTOR
Elmer K. Hansen
By
att'y.

April 27, 1954 — E. K. HANSEN — 2,676,721
VEHICLE GRAIN UNLOADER
Filed May 4, 1951 — 2 Sheets-Sheet 2

INVENTOR
Elmer K. Hansen
Rudolph L. Lowell
By Atty.

Patented Apr. 27, 1954

2,676,721

UNITED STATES PATENT OFFICE 2,676,721

VEHICLE GRAIN UNLOADER

Elmer K. Hansen, Sioux City, Iowa

Application May 4, 1951, Serial No. 224,612

7 Claims. (Cl. 214—519)

This invention relates generally to material unloading vehicles and in particular to a means for unloading forage such as chopped hay, ensilage and the like from a farm wagon or the like.

An object of this invention is to provide an improved unloader means for a vehicle to handle a stalk material.

Yet a further object of this invention is to provide means for unloading stalk material from a vehicle such that the material is continuously discharged at a controlled rate from the vehicle without any clogging of the discharge chute or opening.

Still another object of this invention is to provide a forage handling vehicle having an unloader means which is of a simple construction, and efficient in operation to unload chopped hay or ensilage at a controlled rate of flow directly into a barn or silo, without any clogging or overloading of the unloading means.

Yet another object of this invention is to provide an unloader means for a forage material handling vehicle in which an agitating device within the material container moves and feeds the material at a controlled rate into a discharge conveyer located at the bottom of the container.

Further objects, features and advantages of this invention will become apparent from the following description when taken in connection with the accompanying drawings in which:

Fig. 4 is an enlarged sectional detail view taken substantially along the line 4—4 in Fig. 2; and Fig. 5 is a diagrammatic showing of the power transmission system for the unloading means of this invention.

Figure 1:
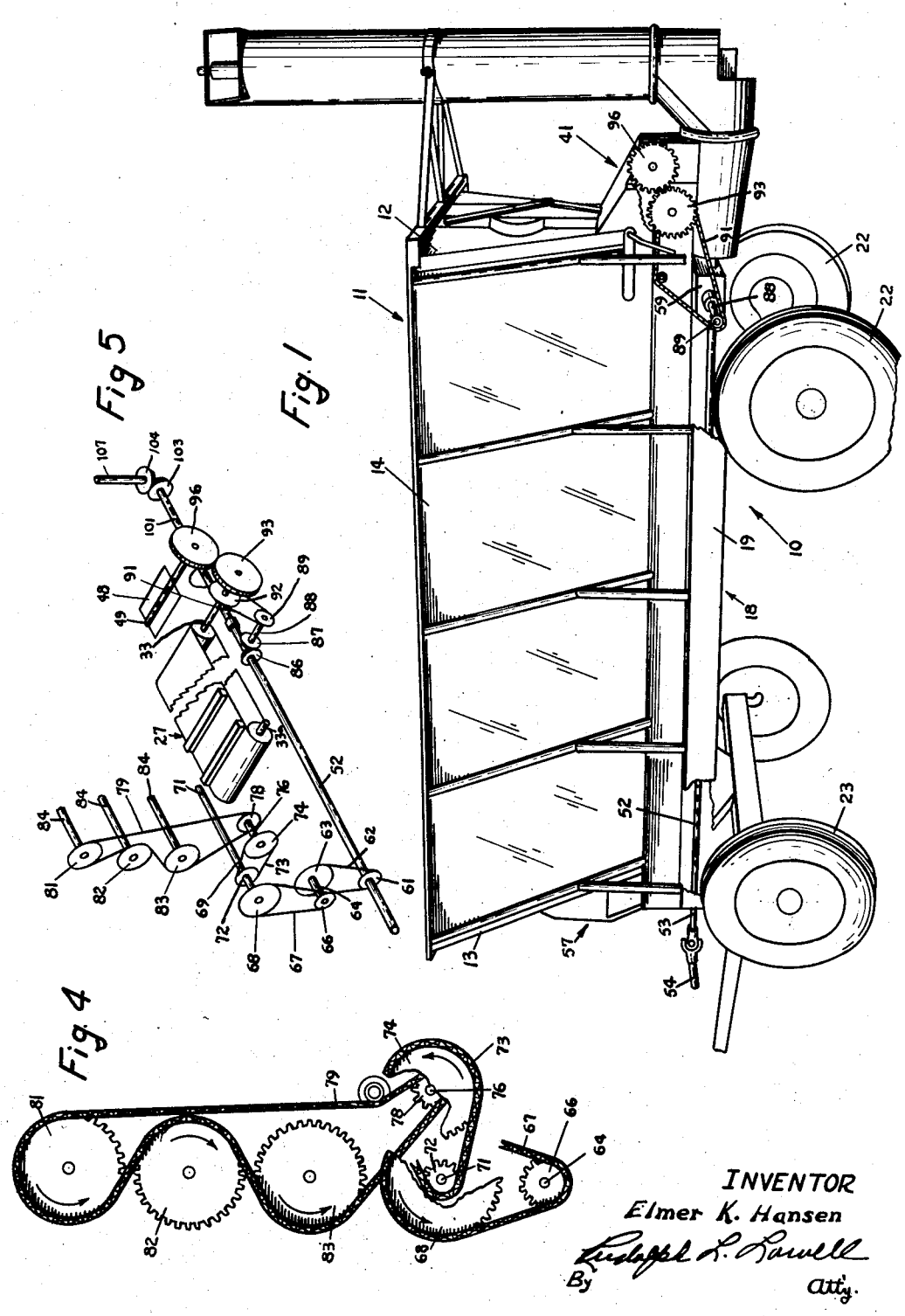
Fig. 1 is a perspective view of a material handling vehicle embodying the material unloading means of this invention with certain parts broken away for the purpose of clarity.
Figures 2, 3:
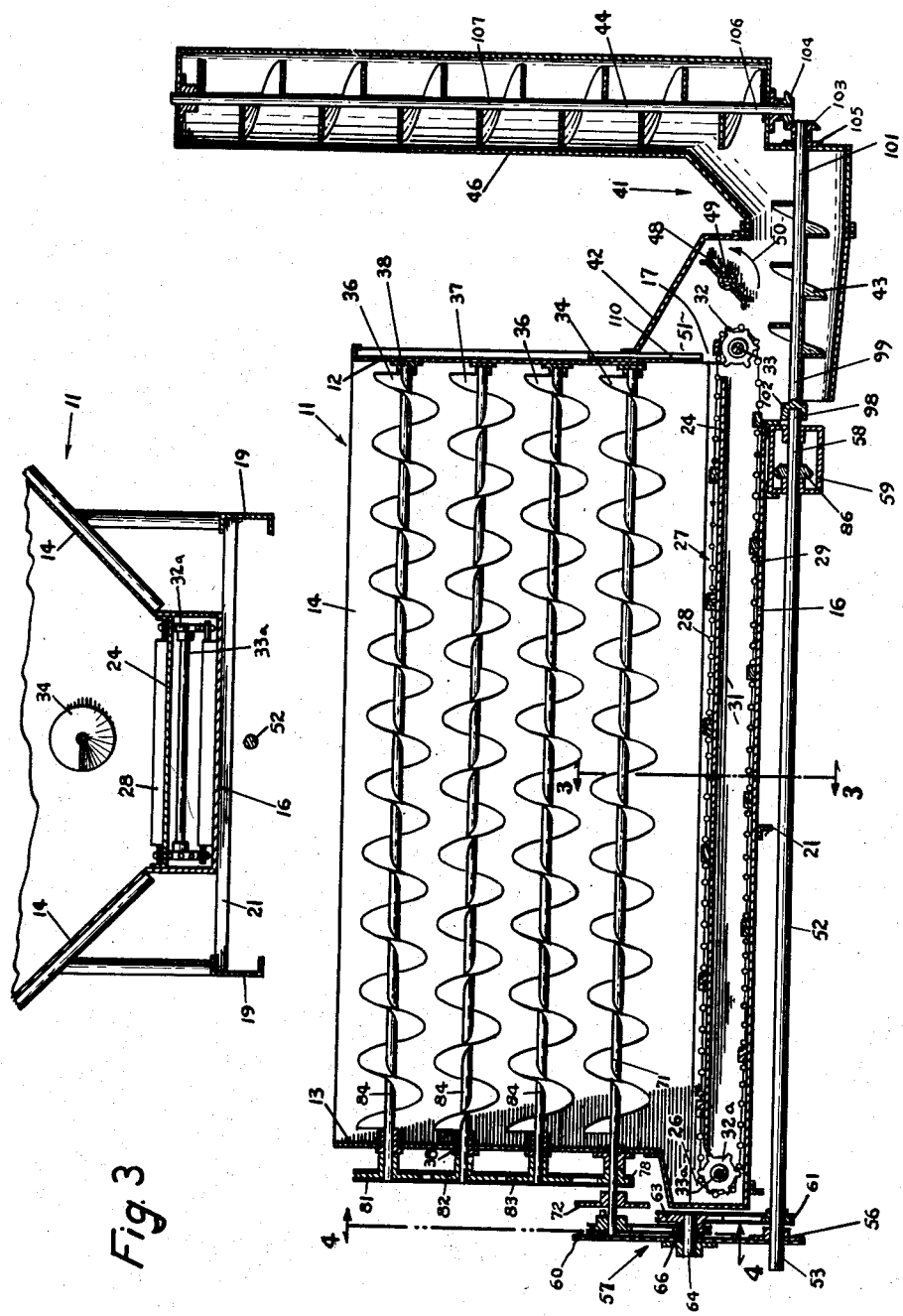
Fig. 2 is a longitudinal sectional view, in a vertical plane, of the material container forming a part of the vehicle shown in Fig. 1, and illustrating therewith the assembly of the material unloading means of this invention.
Fig. 3 is an enlarged sectional detail view taken on substantially line 3—3 in Fig. 2.

With reference to the drawings the material unloading means of this invention is illustrated in Figs. 1 and 2 as applied to a farm wagon 10 having a grain or material container or box 11 of a substantially V-shape, commonly referred to as a flare type box, with end walls 12 and 13, side walls 14 and a bottom wall 16. The end wall 12, hereinafter for convenience to be referred to as the rear wall, is formed at its lower end with a material discharge opening 17. The box 11 is supported on a wagon frame 18 including longitudinal frame members 19 (Fig. 3) connected together by transverse members 21 and provided with rear wheels 22 and front steering wheels 23.

Spaced above the bottom wall 16 (Figs. 2 and 3) is a false bottom 24 which as best appears in Fig. 2 terminates short of the front wall 13 to form an opening 26 in the false bottom 24. A conveyer 27, of drag or slat type, extends longitudinally of the box 11 with its upper length 28 rideable on the false bottom 24 and its lower length 29 movable within the space 31 between the bottoms 16 and 24. The conveyer 27 is rotatably supported on sprockets 32 and 32a which are mounted on transverse shafts 33 and 33a, respectively, suitably supported for rotation on the box sidewalls 14. The sprockets 32 and 32a and shafts 33 and 33a are located within the space 31, with the sprocket 32a being at the opening 26, and the sprocket 32 at the discharge opening 17. The conveyer 27 is thus passed over the sprockets 32 and 32a and about the false bottom 24 through the openings 17 and 26, and is operated in a direction such that the material on the top length 28 thereof is moved toward the rear wall 12 of the wagon box for discharge through the opening 17.

Located within and extended longitudinally of the box 11 are a plurality of feeding and agitating augers 34, 36 and 37, and with four augers being illustrated in Fig. 2. The augers 34, 36 and 37 are rotatably supported in bearings 38 carried on the end walls 12 and 13, and with the augers being disposed in a vertically spaced relation. The auger 37, is of a reversed pitch relative to the augers 34 and 36 for a purpose to be later explained.

An auger attachment indicated generally as 41 (Figs. 1 and 2) includes a housing or casing 42, of a somewhat irregular shape, that is detachably secured in a suitable manner to the rear end of the wagon 10 so as to project rearwardly from the lower end of the rear wall 12. Rotatably supported within the housing 42 is an auger 43 which extends longitudinally of the wagon box 11 at a position below and in an overlapping relation with the rear end of the drag conveyer 27. The conveyer 43 is in operative association with an upright auger conveyer 44 rotatably supported in the housing 42. A rotatable blade or impeller 48 is mounted on a transverse shaft 49 suitably mounted in the housing 42 such that the blade 48 is located rearwardly of the conveyer 27 at a position above the auger 43.

In the operation of the unloading means of this invention for handling a forage material such as chopped hay, or ensilage, the box 11 is loaded in a usual manner. For unloading purposes the drag conveyer 27, feeding augers 34, 36 and 37 and the attachment augers 43 and 44 are operated concurrently. In this unloading operation the feed augers 34 and 36 are rotated in a direction to move the forage material toward the front wall 13, namely, in an opposite direction from the drag conveyer 27. The feed auger 37, which as previously mentioned is of a reverse pitch relative to the augers 34 and 36, is rotated in a reverse direction relative to the augers 34 and 36 so as to also move the material toward the front wall 13.

The function of the augers 34, 36 and 37 is to agitate the material within the box 11 to reduce arching of the material in the box, and the tumbling or dropping of the material onto the conveyer 27 in amounts that would clog the discharge opening 17. Since the conveyer 27 feeds the material toward the rear wall 12, there is a tendency to overload the conveyer 27 at the discharge opening 17, namely, to pile material against the rear wall 12 with a possible consequent clogging of the discharge opening 17, and an uneven rate of discharge of material through the opening 17. This action is overcome by the reversed feeding action of the augers 34, 36 and 37 which act to eliminate any piling up of material against the rear wall 12 by continuously moving the material away from the rear wall and toward the front wall 13.

The augers 34, 36 and 37 thus function to both agitate the material within the box 11, and to control the feeding of the material to the drag conveyer 27 for discharge through the opening 17. This action of the augers may be complemented by their operation at varying speeds of rotation. Thus in one embodiment of the invention, and with the augers being five inches in diameter, the auger 34 was rotated at about 130 R. P. M., while the remaining augers 36 and 37 were rotated at speeds of about 25 R. P. M. For these auger speeds the drag conveyer 27 was operated at a speed of about two hundred fifty feet per minute.

The material moved through the discharge opening 17 by the drag conveyer 27 is acted upon by the impeller or blade 48, which is rotated in a direction as indicated by the arrow 50 in Fig. 2, to move and direct the material into the auger 43 for transfer to the upright conveyer 44. In other words, the impeller 48 prevents any clogging of the passage 51 which communicates the interior of the box 11 with the conveyer 43 as would occur especially with chopped hay due to the light weight of such material.

Where the forage material is merely to be unloaded for stock feeding purposes or the like, the conveyer attachment 41 may be removed, and the material from the opening 17 discharged directly onto the ground or into a feeding bin. Also, where material such as shelled corn, soy beans, ground feed, pellets, stoker coal and the like are to be handled, it is not necessary that the feeding augers 34, 36 and 37 be operated, since this small grain material will readily travel downwardly through the box and because of its small size will not clog the discharge opening 17.

The power transmission system for the unloading means of this invention is best understood from a consideration of Figs. 2, 4 and 5. A power shaft 52 is extended longitudinally of the wagon 10 at a position between the wagon frame side members 19, and has its front end 53 adapted to be connected to a suitable source of power supply such as a power take off of a tractor through a usual connecting shaft indicated at 54. The front end of the shaft 52 is rotatably supported in a bearing 56 which forms part of a gear unit 57 suitably mounted on the forward end of the wagon 10. The rear end 58 of the power shaft 52 is mounted within a differential housing 59 suitably supported from the underside of the wagon box 10 at a position adjacent to the rear end wall 12.

The front end 53 of the shaft 52, within the gear unit 57 carries a sprocket gear 61 which is connected through a chain 62 with a sprocket gear 63 mounted on a shaft 64 which is rotatably supported on the housing 60 of the gear unit 57. A second gear 66 on the shaft 64 is connected through a chain 67 with a gear 68 located within the housing 60 and mounted on the projected end 69 of the shaft 71 for the auger 34. A second gear 72 on the auger shaft 71 is connected through a chain 73 with a sprocket gear 74 mounted on a stub or countershaft 76 rotatably supported within the housing 60 and forming part of the gear unit 57. A second gear 78 on the countershaft 76 is connected through a chain 79 with sprocket gears 81, 82 and 83 which are mounted, respectively, on the projected front ends of the shafts 84 for the augers 36 and 37. As best appears in Figs. 4 and 5 the chain 79 is reversely passed about the gear 82 corresponding to the auger 37, so as to rotate the auger 37 in a reverse direction relative to the rotational direction of the augers 34 and 36. It is seen, therefore, that all of the augers are driven from the power shaft 52 from a common gear 61 and with the gear arrangement providing for a flexibility of operation of the augers both as to speed and direction of rotation.

The rear end of the power shaft 52, within the differential housing 59, carries a bevel gear 86 which is in meshed engagement with a bevel gear 87 mounted on a transversely extended countershaft 88 suitably supported within the differential housing 59. Also mounted on the countershaft 87, and to the outside of the differential housing 59, is a sprocket gear 89 (Figs. 1 and 5) which is connected through a chain 91 with a sprocket gear 92 mounted on a projected end of the conveyer shaft 33, to provide for the operation of the conveyer 27. A tooth gear 93 mounted on the conveyer shaft 33 is in meshed engagement with a tooth gear 96 mounted on the shaft 49 for the impeller 48. It is thus seen that the conveyer 27 and impeller 48 are driven from the counter-shaft 87.

The rear end 58 of the power shaft 52 (Fig. 2) projects rearwardly outwardly from the differential housing 59 and terminates in a shank portion 98 of a square shape in transverse cross section. The front end 99 of the shaft 101 for the auger 43 projects forwardly from the casing 42 and terminates in a socket member 102 for receiving the shank member 98 of the power shaft 52. The rear end of the auger shaft 101 is supported in a bearing 105 on the housing 42 and projects rearwardly from the housing 42. This projected end of the auger shaft 101 carries a bevel gear 103 which is in meshed engagement with a bevel gear 104 mounted at the lower end 106 of the shaft 107 of the upright auger 44. The auger shaft 101 thus constitutes an extension of the power shaft 52, so that the augers 43 and 44 are driven directly from the power shaft 52.

It is readily apparent that the power transmission system above described may be modified to incorporate clutch controls to provide for the independent or concurrent operation of the augers 34, 36 and 37, the impeller 48 and the conveyor 27. From a consideration of the above description it is seen that the invention provides an unloading means for a grain vehicle which is of a compact and rugged construction, and efficient in operation to unload either a forage material or a small grain material at a mechanically controlled rate for discharge either into feed bunks or feed bins. The rate of discharge for various materials may further be controlled by the provision of an end gate 110 (Figs. 1 and 2) which is slidably supported for vertical movement on the rear side of the rear wall 12 for traverse across the discharge opening 17. The augers 34, 36 and 37 function as both agitators and material feeders to regulate and distribute on the conveyor 27 the material to be handled for discharge through the opening 17. Also the impeller 48 functions to both move and direct material discharged from the conveyor 27 onto the conveyor 43 for transfer to the conveyor 44.

Although the invention has been described with respect to a preferred embodiment thereof it is to be understood that it is not to be so limited since changes and modifications can be made therein which are within the full intended scope of this invention as defined by the appended claims.

I claim:

1. For use with a material handling vehicle having a material container with end walls and a bottom wall and a discharge opening in one of said end walls, a material unloading means including a longitudinal conveyor adjacent the bottom wall of said container for discharging material through said opening, a plurality of longitudinally extended augers within said container rotatably supported in said end walls, said augers being arranged in a vertically spaced relation above said conveyor, and means for driving said augers to move material in a direction away from said discharge opening.

2. For use with a material handling vehicle having a material container with end walls and a bottom wall and a discharge opening in one of said end walls, a material unloading means including a longitudinally extended conveyor adjacent the bottom wall of said container for moving material through said discharge opening, a pair of longitudinally extended augers within said container rotatably supported on said end walls, said augers being in a vertically spaced relation above said conveyor, and means for driving said augers to move material in a direction away from said discharge opening, with the lower auger being driven at a rotational speed greater than that of the upper auger.

3. For use with a material handling vehicle having a material container with end walls and a bottom wall and a discharge opening in one of said end walls, material unloading means including a longitudinally extended conveyor within said container located adjacent said bottom wall and having one end projected through said discharge opening to move material through said opening, a second longitudinally extended conveyor to the outside of said container located below and extended outwardly from the projected end of said first conveyor, an upright conveyor having the lower end thereof in a position to receive material from said second conveyor, and means located above said second conveyor and outwardly from the projected end of said first conveyor for moving material discharged from said first conveyor onto said second conveyor.

4. For use with a material handling vehicle having a material container with end walls and a bottom wall and a discharge opening in one of said end walls, a material unloading means including a conveyor extended longitudinally of said container and adjacent to said bottom wall for moving material through said discharge opening, and a series of substantially vertically aligned material feeding and agitating means extended longitudinally of said container above said conveyor and mounted on said end walls for feeding material away from said one end wall.

5. In a material handling vehicle having a material container with end walls, a bottom wall, side walls having sections inclined upwardly and outwardly from said bottom wall, and a discharge opening in one of said end walls, a material unloading means including a longitudinally extended conveyor within said container and adjacent to said bottom wall for discharging material through said opening, a plurality of material feeding augers located within and extended longitudinally of said container, means rotatably supporting said augers in said end walls in a vertically spaced relation above said conveyor, and within the vertical dimensions defined by said inclined sections, and means for rotating said augers, to feed material away from said one end wall.

6. A material handling vehicle comprising a material container having end walls and a bottom wall and a discharge opening in one of said end walls, material unloading means including a conveyor extended longitudinally of said container and adjacent to said bottom wall for moving material through said discharge opening, a plurality of material feeding and agitating members supported at their ends in said end walls and extended longitudinally of said container above said conveyor and with said members being relatively arranged in said container at vertically spaced positions with the lowermost member positioned adjacent said conveyor and the uppermost member positioned adjacent the upper sides of said end walls.

7. In a material handling vehicle having a material container with end walls and a bottom wall and a discharge opening in one of said end walls, material unloading means including a longitudinally extended conveyor within said container and adjacent the bottom wall for discharging material through said opening, a plurality of material feeding and agitating augers located within and extended longitudinally of said container, means rotatably supporting said augers in said end walls in a vertically spaced and substantially vertically aligned relation above said conveyor, and means for rotating said augers.

References Cited in the file of this patent

UNITED STATES PATENTS

| Number | Name | Date |
|---|---|---|
| 1,220,953 | Cornwall | Mar. 27, 1917 |
| 1,505,863 | Chayer | Aug. 19, 1924 |
| 1,598,842 | Arrowood | Sept. 7, 1926 |
| 2,293,977 | Hoffstetter | Aug. 25, 1942 |
| 2,406,886 | McBean | Sept. 3, 1946 |
| 2,438,301 | Schulte | Mar. 23, 1948 |
| 2,488,965 | Dear | Nov. 22, 1949 |
| 2,555,558 | Peterson | June 5, 1951 |
| 2,575,639 | Scranton et al. | Nov. 20, 1951 |
| 2,613,004 | Kane | Oct. 7, 1952 |